(12) United States Patent
Kizler

(10) Patent No.: US 12,187,349 B2
(45) Date of Patent: Jan. 7, 2025

(54) BULKHEAD PART

(71) Applicant: Henkel AG & Co. KGaA, Duesseldorf (DE)

(72) Inventor: Tobias Kizler, Mundelsheim (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 299 days.

(21) Appl. No.: 17/805,064

(22) Filed: Jun. 2, 2022

(65) Prior Publication Data

US 2022/0289309 A1     Sep. 15, 2022

Related U.S. Application Data

(63) Continuation of application No. PCT/EP2020/082026, filed on Nov. 13, 2020.

(30) Foreign Application Priority Data

Dec. 3, 2019  (DE) .......................... 102019132868.3

(51) Int. Cl.
*B62D 29/00*     (2006.01)
(52) U.S. Cl.
CPC .................. *B62D 29/002* (2013.01)
(58) Field of Classification Search
CPC ...... B62D 29/00; B62D 29/002; B62D 25/00; B60Y 2410/12; B29C 44/18
See application file for complete search history.

(56) References Cited

U.S. PATENT DOCUMENTS

| | | | |
|---|---|---|---|
| 5,172,452 | A | 12/1992 | Brown |
| 2006/0043772 | A1 | 3/2006 | Richardson |
| 2010/0253004 | A1 | 10/2010 | Lehmann et al. |
| 2013/0241226 | A1 | 9/2013 | Shantz et al. |

(Continued)

FOREIGN PATENT DOCUMENTS

| | | | | |
|---|---|---|---|---|
| DE | 10240196 A1 | * | 3/2004 | ........... B62D 29/002 |
| EP | 1031496 A1 | | 8/2000 | |

(Continued)

OTHER PUBLICATIONS

International Search Report for PCT/EP2020/082026 mailed Feb. 23, 2021.

*Primary Examiner* — Lori Lyjak
(74) *Attorney, Agent, or Firm* — Mary K. Cameron

(57) ABSTRACT

A cavity sealing bulkhead part is provided comprising a first structural component, a second structural component and a hinge for producing a movable connection between the first structural component and the second structural component; the hinge comprising a first hinge component assigned to the first structural component and a second hinge component assigned to the second structural component, the first hinge component and the second hinge component being movable relative to one another about a shaft, at least one of the two hinge components comprising an expansion material that is convertible from an initial state into an expanded state by activation, and in the expanded state acting as a sealant between the first and second hinge components; and the bulkhead part being produced in a two-component injection molding process using a carrier material and the expansion material; also provided are methods for producing the bulkhead part.

15 Claims, 3 Drawing Sheets

(56) References Cited

U.S. PATENT DOCUMENTS

| | | | |
|---|---|---|---|
| 2014/0087126 A1* | 3/2014 | Quaderer | B29C 44/18 |
| | | | 156/244.11 |
| 2016/0263855 A1* | 9/2016 | Quaderer | B32B 7/027 |
| 2017/0239856 A1 | 8/2017 | Skinner et al. | |
| 2019/0100251 A1 | 4/2019 | Bradley | |

FOREIGN PATENT DOCUMENTS

| | | | | |
|---|---|---|---|---|
| EP | 2236358 A1 | 10/2010 | | |
| EP | 1562788 B1 | 9/2014 | | |
| EP | 3037328 A1 | 6/2016 | | |
| JP | 2011111786 A | 6/2011 | | |
| WO | WO-2013138290 A1 * | 9/2013 | | B22F 3/004 |
| WO | WO-2015086118 A1 * | 6/2015 | | B29C 44/188 |
| WO | 2017161114 A1 | 9/2017 | | |

* cited by examiner

BULKHEAD PART

The invention relates to a bulkhead part for sealing a cavity, comprising a first structural component and a second structural component and a hinge for producing a movable connection between the first structural component and the second structural component, the hinge comprising a first hinge component assigned to the first structural component and a second hinge component assigned to the second structural component, and the first hinge component and the second hinge component being movable relative to one another about a shaft.

In the automotive sector, such bulkhead parts are used for acoustic and/or watertight sealing and bulkheading of cavities in the body. They often consist of two or more structural components, two structural components in each case being connected to one another in a movable, in particular foldable manner by means of one or more hinges. The mobility between the individual structural components caused by the hinges serves, on the one hand, to allow the bulkhead part to be optimally fitted into the cavity to be sealed. On the other hand, it allows the bulkhead part to have a different shape during transport and storage than when it is later installed. In particular, such a bulkhead part can be transported and stored flat, for example, while it is converted into a three-dimensional shape only during installation.

EP 1 562 788 B1 discloses a bulkhead part referred to as a sealing barrier, which can be used in vehicle body construction and consists of two carriers connected to one another by a hinge. The two carriers are provided around the periphery with an expansion material which, in the installed state of the sealing barrier, can be converted from an initial state into an expanded state by activation, in which expanded state it acts as a sealing material between the carriers and adjacent components. The hinge is designed as a simple film hinge. Film hinges substantially consist of a one-piece, thin-walled connection, often designed as a joint groove, between the structural components. The mobility is brought about by bending and deforming the material from which the film hinge is formed. However, such film hinges have various disadvantages. They can be loaded only to a limited extent and usually only a comparatively small number of repetitions of the movement is possible before the film hinge may break or crack due to brittleness and material fatigue. In addition, the freedom of movement of the structural components connected to one another is generally restricted when using film hinges compared to the use of hinges which consist of several components.

Alternatively, hinges are also used in the prior art which consist of several hinge components that are movable relative to one another. Examples of this are strap hinges, arch hinges or arm hinges. However, such hinges generally do not offer any watertightness in the hinge region, which is why they are suitable only to a limited extent for the field of application of sealing cavities.

SUMMARY OF THE INVENTION

An object of the present invention is to provide a bulkhead part of the type in question which, when installed, offers very good sealing against noise and moisture and which moreover has a high load-carrying capacity in the hinge region. A further object of the invention is to provide a method for producing such a bulkhead part.

These objects are achieved by a bulkhead part 1 for sealing a cavity, comprising a first structural component 2 and a second structural component 3 and a hinge 4 for producing a movable connection between the first structural component 2 and the second structural component 3, the hinge 4 comprising a first hinge component 5 assigned to the first structural component 2 and a second hinge component 6 assigned to the second structural component, and the first hinge component 5 and the second hinge component 6 being movable relative to one another about a shaft 7, characterized in that at least one of the two hinge components 5, 6 comprises an expansion material 8, it being possible to convert the expansion material 8 from an initial state into an expanded state by activation, in which expanded state it acts as a sealant between the first and second hinge components 5, 6, and the bulkhead part 1 being produced in a two-component injection molding process using a carrier material and the expansion material 8; and by a method for producing such a bulkhead part in a two-component injection molding process, comprising steps of:

providing a carrier material;
molding the structural components and portions of the hinge components not consisting of expansion material from the carrier material in an injection mold using an injection molding process;
providing an expansion material;
overmolding the structural components with the expansion material in the injection molding process;
removing the bulkhead part from the injection mold.

The subject matter of the dependent claims relates to advantageous designs and developments of the invention.

In other words, according to one embodiment of the invention the first and second structural components of the bulkhead part are connected to one another by a hinge consisting of several components that are movable relative to one another, at least one of the two hinge components comprising an expansion material. The expansion material can be converted from an initial state into an expanded state by activation and, in this expanded state, acts as a sealant in the region of the hinge, in particular between the first hinge component and the second hinge component. Such a hinge offers, on the one hand, a high load-carrying capacity and freedom of movement due to its formation from several components. In particular, regions in which the hinge material has to be bent or deformed, as in the case of a film hinge, can be dispensed with. Since at least one hinge component comprises an expansion material which, when activated, changes to an expanded state and thereby fills and seals the free spaces and gaps in the hinge region, on the other hand excellent tightness, in particular against moisture, is also provided in the hinge region. The bulkhead part is produced according to the invention in a two-component injection molding process using a carrier material and the expansion material.

According to the invention, the expansion material is itself part of the hinge. In principle, it has two functions: in its initial state, in which it has not yet expanded, it contributes as part of the hinge to the mobility of the two structural components relative to one another. In the expanded state, it ensures the moisture-proof sealing of the hinge region.

The expansion material can, for example, be a material which foams when activated and solidifies in the foamed state. It can, for example, be a product from the product range known as Teroson®. The volume of the expanded expansion material can be approximately 150% to 3000% of the volume of the expansion material in the initial state.

According to a proposal of the invention, the expansion material can be converted from the initial state into the expanded state by thermal activation, i.e. by the introduction of thermal energy. In vehicle body construction, for example, the introduction of heat can take place in the KTL furnace through which the painted components pass to cure the paint. In other words, the bulkhead part is first installed in the body for bulkheading a cavity, while the actual sealing in the hinge region and optionally to the surrounding components through expansion of the expansion material only takes place afterwards when it passes through the KTL furnace.

Alternatively, other physical and/or chemical forms of activation are also conceivable.

In one design variant of the invention, at least one of the two hinge components consists entirely of the expansion material. The hinge component can be produced by overmolding a portion of the associated structural component made from carrier material with expansion material in a corresponding injection mold.

According to a further embodiment of the invention, both hinge components comprise an expansion material. In principle, it is also conceivable that both hinge components are made entirely from the expansion material.

The shaft about which the first hinge component and second hinge component are movable relative to one another can comprise carrier material in one embodiment of the invention. It can be made entirely of carrier material. The carrier material can be, for example, polyamide or a comparable material. The shaft can be formed as a portion of the first hinge component from the carrier material, while the expansion material, which completely or partially forms the second hinge component, is injected around this shaft in a two-component injection molding process.

According to a further proposal of the invention, the shaft about which the first hinge component and the second hinge component are movable relative to one another comprises expansion material. The shaft can consist entirely of expansion material.

The shaft made of carrier material and/or expansion material can be designed in the shape of a pin and have a round cross section. Alternatively, it can also have any polygonal, in particular a triangular or square, cross section. In this way, using the flexibility of at least one of the hinge components, a grid function can be generated in such a way that preferred alignments can be set between the two structural components connected to one another by the hinge. In principle, the shaft can have any cross-sectional shape, for example also that of a constant thickness. The cross-sectional shape of the shaft can also be gear-like with individual teeth or teeth and/or locking elements distributed over the circumference of the cross section. Due to the specific shape of the teeth and/or locking elements, again using the flexibility of at least one of the hinge components, preferred alignments and/or a preferred direction of rotation between the two hinge components can be established.

In addition, by selecting the surface roughness of the carrier material and/or the expansion material, it is possible to influence the force that is required to move the two structural components relative to one another. The greater the surface roughness, the greater the friction between the two hinge components and the greater the force required for movement.

According to another embodiment, the invention also relates to a method for producing such a bulkhead part in a two-component injection molding process, comprising the following steps:
    providing a carrier material;
    molding the structural components and the parts of the hinge components not consisting of expansion material from the carrier material in an injection mold using an injection molding process;
    providing an expansion material;
    overmolding the structural components with the expansion material in the injection molding process, in particular thus forming the hinge component comprising the expansion material;
    removing the bulkhead part from the injection mold.

In other words, in the method according to the invention, in order to form the bulkhead part, first the structural components and the parts of the hinge components that do not consist of expansion material are injection molded from the carrier material, for example from polyamide, in a suitable mold. In a subsequent method step, the structural components and hinge components are overmolded with the expansion material, in particular the hinge component comprising the expansion material being formed. The components are preferably completely overmolded with expansion material beyond the hinge region. Finally, the bulkhead part is removed from the injection mold. The structural components and optionally the hinge components can be formed from the carrier material in the same injection mold as the subsequent overmolding with expansion material. However, different shapes can also be used for the injection molding of the structural components and the subsequent overmolding with expansion material.

In principle, depending on the materials used, it is also possible according to the invention to first inject the components made of expansion material and then to overmold them with the carrier material in the same or in a different injection mold.

A bulkhead part designed in this way has the advantage that it can have a different shape during transport and storage than when it is later installed. Due to the robust design of the hinge, any angle settings between the two structural components and any number of actuations of the hinge are possible. After the bulkhead part has been installed for bulkheading a cavity and the expansion material has expanded, for example through the introduction of heat, the bulkhead part is very tight both in the hinge region and in relation to adjacent components.

BRIEF DESCRIPTION OF THE DRAWINGS

The invention is explained in greater detail below on the basis of embodiments and with reference to the accompanying drawings, in which.

DETAILED DESCRIPTION OF EMBODIMENTS OF THE INVENTION

Figure 1:
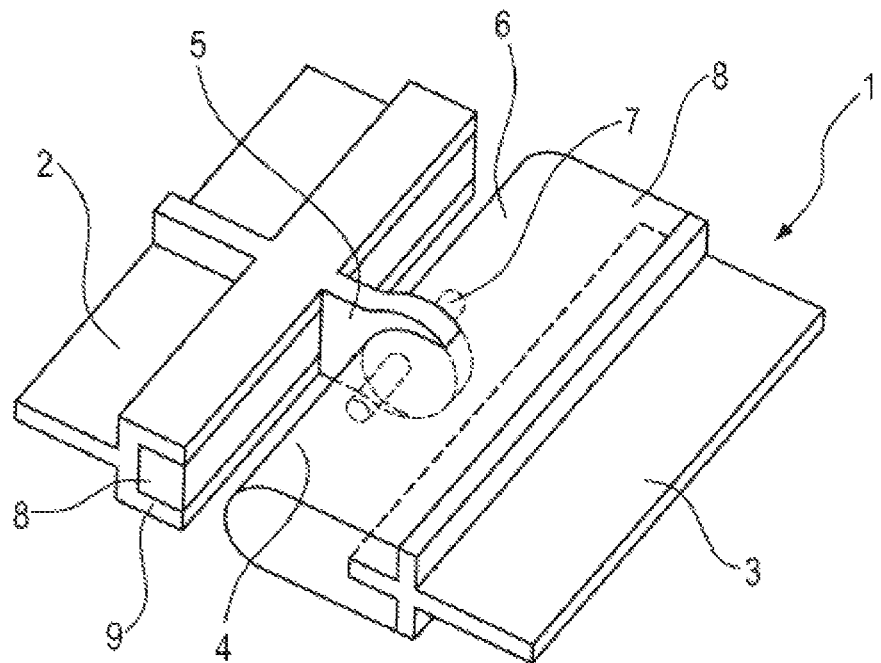
FIG. 1 is a perspective view of the hinge region of a bulkhead part according to the invention in a planar orientation, the expansion material being in the initial state.
Figure 2:
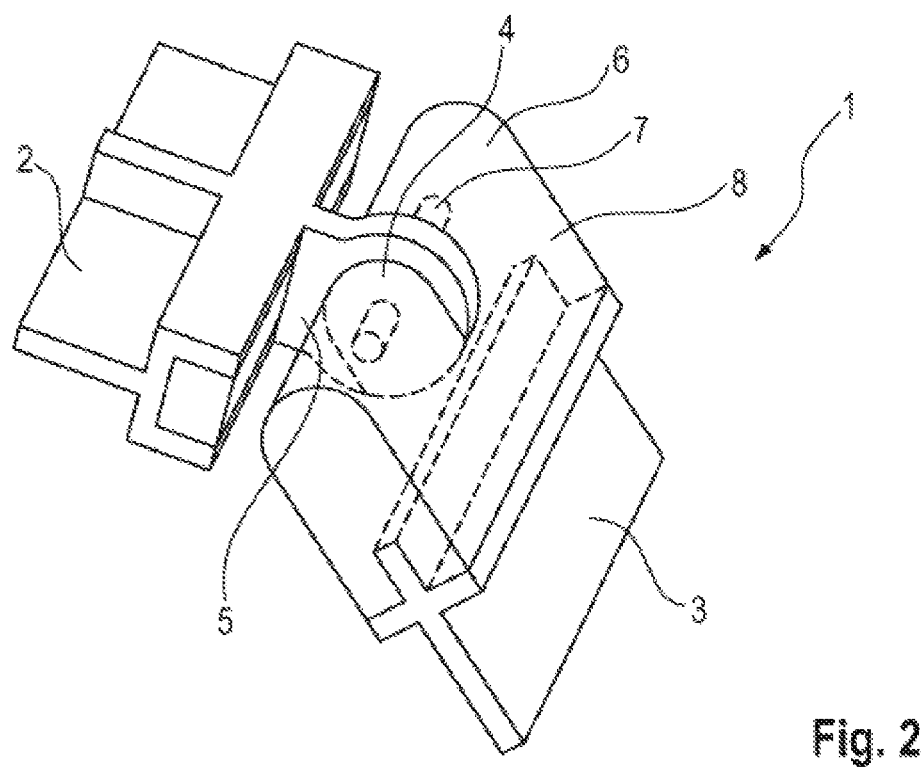
FIG. 2 shows the hinge region from FIG. 1 in a pivoted orientation, the expansion material being in the initial state.
Figure 3:
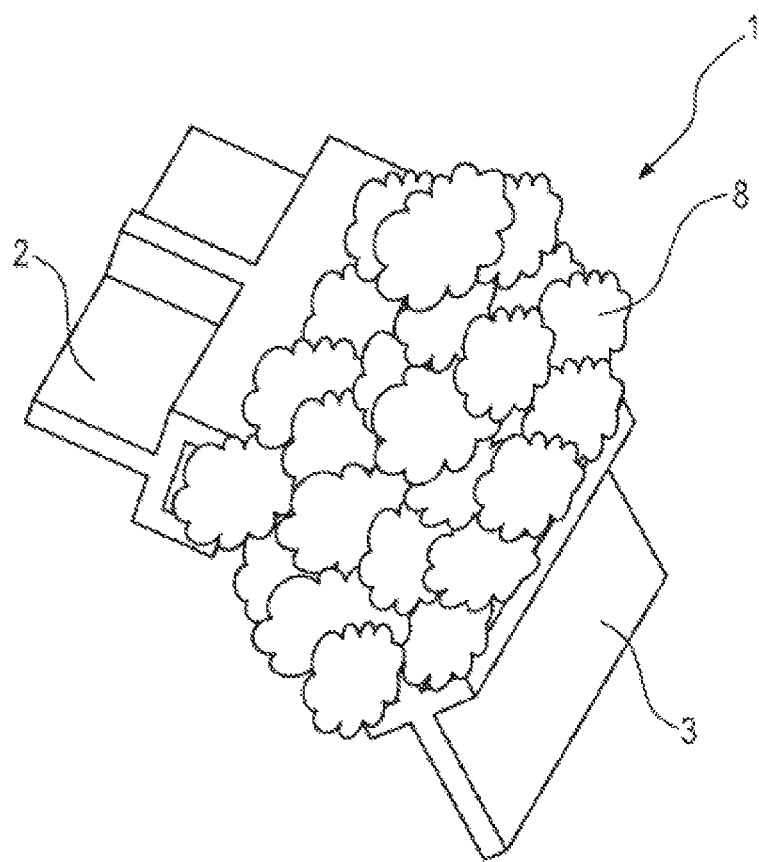
FIG. 3 shows the hinge region as in FIG. 2, the expansion material having been converted into an expanded state.

FIG. 1 shows a section of a bulkhead part according to the invention, designated as a whole by reference sign 1, which bulkhead part comprises a first structural component 2 and a second structural component 3 and a hinge 4 for producing a movable connection between the first structural component 2 and the second structural component 3. The illustration in FIGS. 1 to 3 shows only the hinge region and the adjoining regions of the structural components 2 and 3. The structural components 2 and 3 are not shown in their full extent.

The bulkhead part 1 can be used, for example, to seal a cavity in a body. Due to the movable connection between the structural components 2 and 3 brought about by the hinge 4, the bulkhead part 1 can be produced, transported and stored, for example, in the flat, planar orientation shown in FIG. 1, while for installation the second structural component 3 can be pivoted with respect to the first structural component 2 by any angle; see FIGS. 2 and 3. The structural components 2 and 3 are formed from a carrier material, for example from polyamide, using an injection molding process.

The hinge 4 comprises a first hinge component 5 assigned to the first structural component 2 and a second hinge component 6 assigned to the second structural component 3. The hinge components 5 and 6 are movable relative to one another about a shaft 7. In the embodiment shown in FIGS. 1 to 3, the shaft 7 is designed as part of the first hinge component 5. The first hinge component 5 and with it the shaft 7 are made of carrier material. The shaft 7 is pin-shaped and has a round cross section.

The second hinge component 6 is made entirely of an expansion material 8. The expansion material 8 has the property of changing from an initial state in which it has not yet expanded into an expanded state when activated through the introduction of heat. In the illustration of FIGS. 1 and 2, the expansion material 8, from which the complete second hinge component 6 is formed here, is shown in its initial state. In this initial state, the material has sufficient strength to act as a hinge component 6. In the embodiment shown in FIG. 1, not only is the second hinge component 6 made of the expansion material 8, but a gap 9 is also provided with expansion material 8 in the region of the first structural component 2.

FIG. 3 shows the bulkhead part 1 after it has passed through a KTL furnace, for example. The expansion material 8 has changed from its initial state shown in FIGS. 1 and 2 to an expanded state through the introduction of heat. The expansion material 8 is expanded in such a way that it now acts as a sealing material between the first structural component 2 and the second structural component 3. In particular, it seals the hinge region, i.e. it penetrates the free spaces and gaps in the hinge region and fills them so that the first hinge component 5 opposite the second hinge component 6 is completely sealed against moisture and noise when the bulkhead part 1 is installed.

The bulkhead part 1 is produced in a two-component injection molding process using the carrier material and the expansion material 8. For this purpose, the carrier material, for example polyamide, is first provided, from which the first structural component 2, the second structural component 3 and the hinge component 5, including the shaft 7, which does not consist of expansion material 8, are formed in an injection mold. In a subsequent method step, the expansion material 8 is provided and the structural components 2 and 3 are overmolded with the expansion material 8. In particular, the second hinge component 6 is formed by overmolding the first hinge component 5 and the shaft 7. The overmolding with expansion material 8 can take place in the same or in a different injection mold than the molding of the structural components 2, 3. Finally, the finished bulkhead part 1 is removed from the injection mold.

Figure 4:
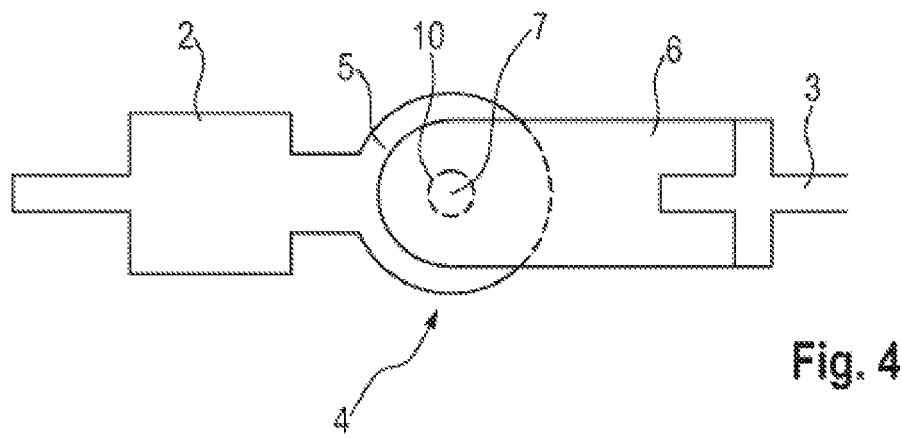
FIG. 4 is a schematic sectional view of a design variant of the hinge region.
Figure 5:
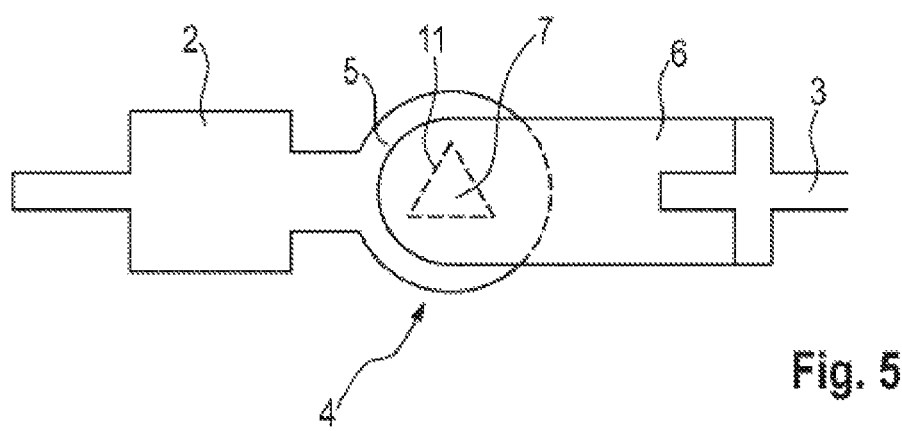
FIG. 5 is a schematic sectional view of an alternative design variant of the hinge region.

FIGS. 4 and 5 are schematic sectional views of different design variants of the region of the hinge 4 with the first hinge component 5 and the second hinge component 6. FIG. 4 shows a shaft 7 having a round cross section, while FIG. 5 shows a shaft 7 having a triangular cross section. In both cases, the shaft 7 can in principle be made from the carrier material, which is then overmolded with expansion material 8 to form the second hinge component 6, as shown in the embodiment variant according to FIGS. 1 to 3. Alternatively, the shaft 7 can also be made entirely or partially of expansion material 8. In this case, the first hinge component 5 has a circular recess 10 or a triangular recess 11; when the first hinge component 5 is overmolded, the expansion material 8 is injected in such a way that it extends through the recess 10 or 11 and can act in this region later than the shaft 7.

Figure 6:
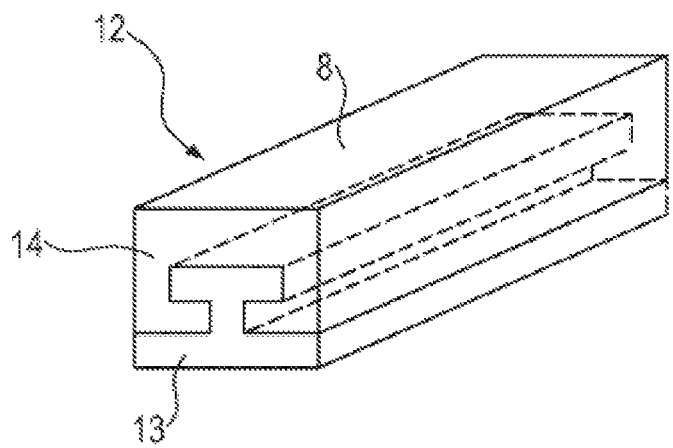
FIG. 6 shows a rail produced using the two-component injection molding process, which rail allows the two components to move relative to one another.

FIG. 6 shows a further possibility of aligning and sealing two structural components (not shown here) relative to one another. In this case, the alignment takes place by means of a rail 12 produced using the two-component injection molding process, the rail 12 allowing a sliding relative movement between a first rail component 13 and a second rail component 14. The first rail component 13 is in turn made from a carrier material, for example from polyamide, while the second rail component 14 is made from expansion material 8. Here, too, the two rail components 13, 14 can be moved relative to one another in the initial state of the expansion material 8. Once a desired alignment has been found, the expansion material 8 can be converted into an expanded state by the introduction of heat and act as a sealing material. Production takes place in the two-component injection molding process, by the first rail component 13 first being injected from the carrier material and this then being overmolded with the expansion material 8 to form the second rail component 14.

The invention claimed is:

1. A bulkhead part for sealing a cavity, comprising a first structural component and a second structural component and a hinge for producing a movable connection between the first structural component and the second structural component, the hinge comprising a first hinge component assigned to the first structural component and a second hinge component assigned to the second structural component, and the first hinge component and the second hinge component being movable relative to one another about a shaft, wherein at least one of the two hinge components comprises an expansion material, it being possible to convert the expansion material from an initial state into an expanded state by activation, in which expanded state it acts as a sealant between the first and second hinge components, and the bulkhead part being produced in a two-component injection molding process using a carrier material and the expansion material.

2. The bulkhead part according to claim 1, wherein the expansion material can be converted from the initial state into the expanded state by thermal activation.

3. The bulkhead part according to claim 2, wherein at least one of the two hinge components consists entirely of the expansion material.

4. The bulkhead part according to claim 3, wherein both hinge components comprise an expansion material.

5. The bulkhead part according to claim 4, wherein the shaft about which the first hinge component and the second hinge component are movable relative to one another comprises carrier material.

6. The bulkhead part according to claim 5, wherein the shaft about which the first hinge component and the second hinge component are movable relative to one another comprises expansion material.

7. The bulkhead part according to claim 6, wherein the shaft has an angular cross section.

8. The bulkhead part according to claim 1, wherein at least one of the two hinge components consists entirely of the expansion material.

9. The bulkhead part according to claim 1, wherein both hinge components comprise an expansion material.

10. The bulkhead part according to claim 1, wherein the shaft about which the first hinge component and the second hinge component are movable relative to one another comprises carrier material.

11. The bulkhead part according to claim 1, wherein the shaft about which the first hinge component and the second hinge component are movable relative to one another comprises expansion material.

12. The bulkhead part according to claim 1, wherein the shaft has an angular cross section.

13. The bulkhead part according to claim 12, wherein the shaft has a triangular or square cross section.

14. A method for producing a bulkhead part according to claim 1 in a two-component injection molding process, comprising steps of:

providing a carrier material;

molding the structural components and portions of the hinge components not consisting of expansion material from the carrier material in an injection mold using an injection molding process;

providing an expansion material;

overmolding the structural components with the expansion material in the injection molding process;

removing the bulkhead part from the injection mold.

15. The method for producing a bulkhead part according to claim 14, wherein the overmolding of the structural components with the expansion material comprises forming the hinge component comprising the expansion material.

* * * * *